United States Patent
Temblador

(10) Patent No.: US 10,325,696 B2
(45) Date of Patent: Jun. 18, 2019

(54) FLEXIBLE CABLE WITH STRUCTURALLY ENHANCED CONDUCTORS

(75) Inventor: Richard Temblador, Carrollton, GA (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

(21) Appl. No.: 12/792,642

(22) Filed: Jun. 2, 2010

(65) Prior Publication Data

US 2011/0297418 A1 Dec. 8, 2011

(51) Int. Cl.
*H01B 7/18* (2006.01)
*H01B 13/14* (2006.01)
*H01B 9/02* (2006.01)

(52) U.S. Cl.
CPC .......... *H01B 7/189* (2013.01); *H01B 13/148* (2013.01); *H01B 9/028* (2013.01); *Y10T 29/49117* (2015.01)

(58) Field of Classification Search
CPC ........ H01B 9/028; H01B 7/0869; H01B 7/17; H01B 7/18; H01B 7/20; H01B 7/24; H01B 7/228; H01B 7/189; H01B 13/148; Y10T 29/49117
USPC ............. 174/105 R, 110 R, 113 C, 98, 99 R, 174/102 P, 102 R, 103, 107, 102 D
See application file for complete search history.

(56) References Cited

U.S. PATENT DOCUMENTS

| | | | |
|---|---|---|---|
| 1,781,574 A | * | 11/1930 | Frederickson ......... H01B 7/226 138/131 |
| 2,043,044 A | * | 6/1936 | Knoderer ............... H01B 7/202 174/102 D |
| 2,120,088 A | * | 6/1938 | Carlson ................. H01B 9/028 174/109 |
| 2,276,437 A | | 3/1942 | Gordon |
| 2,685,707 A | | 8/1954 | Llewellyn et al. |
| 2,930,838 A | | 3/1960 | Chizallet et al. |
| 3,032,604 A | * | 5/1962 | Timmons ........... H01B 11/1016 174/107 |
| 3,064,073 A | | 11/1962 | Downing |
| 3,108,981 A | | 10/1963 | Clark et al. |
| 3,191,005 A | | 6/1965 | Cox 2nd |
| 3,258,031 A | | 6/1966 | French |
| 3,378,628 A | | 4/1968 | Garner |
| 3,452,434 A | * | 7/1969 | Wagele ........................ 174/118 |

(Continued)

FOREIGN PATENT DOCUMENTS

| | | |
|---|---|---|
| DE | 4410456 A1 | 9/1995 |
| EP | 0283132 A2 | 9/1988 |

(Continued)

OTHER PUBLICATIONS

Foreign Patent WO 02/47092 provided with Office Action.*

(Continued)

*Primary Examiner* — Roshin K Varghese
(74) *Attorney, Agent, or Firm* — Foley & Lardner LLP

(57) ABSTRACT

In an electrical cable of the type having an outer sheath enclosing a conductor assembly comprising a plurality of insulated conductors disposed within a binder, the binder having a crush resistance for protecting the insulated conductors, an improvement in which a strength enhancer is mixed within the conductor insulation such that the binder can be removed without decreasing a crush resistance of the electrical cable.

19 Claims, 2 Drawing Sheets

(56) References Cited

U.S. PATENT DOCUMENTS

| | | | |
|---|---|---|---|
| 3,668,175 A | 6/1972 | Sattler | |
| 3,849,221 A | 11/1974 | Middleton | |
| 3,852,875 A | 12/1974 | McAmis et al. | |
| 3,868,436 A | 2/1975 | Ootsuji et al. | |
| 3,877,142 A | 4/1975 | Hamano et al. | |
| 3,885,286 A | 5/1975 | Hill | |
| 3,936,572 A | 2/1976 | MacKenzie, Jr. et al. | |
| 4,002,797 A | 1/1977 | Hacker et al. | |
| 4,057,956 A | 11/1977 | Tolle | |
| 4,099,425 A | 7/1978 | Moore | |
| 4,100,245 A | 7/1978 | Horikawa et al. | |
| 4,137,623 A | 2/1979 | Taylor | |
| 4,273,806 A | 6/1981 | Stechler | |
| 4,274,509 A | 6/1981 | Thomson et al. | |
| 4,275,096 A | 6/1981 | Taylor | |
| 4,299,256 A | 11/1981 | Bacehowski et al. | |
| 4,356,139 A | 10/1982 | Rowland et al. | |
| 4,360,492 A | 11/1982 | Rowland et al. | |
| 4,416,380 A | 11/1983 | Flum | |
| 4,454,949 A | 6/1984 | Flum | |
| 4,522,733 A | 6/1985 | Jonnes | |
| 4,569,420 A | 2/1986 | Pickett et al. | |
| 4,605,818 A | 8/1986 | Arroyo et al. | |
| 4,611,656 A * | 9/1986 | Kendall et al. | 174/136 |
| 4,673,516 A | 6/1987 | Berry | |
| 4,684,214 A | 8/1987 | Goldmann et al. | |
| 4,693,936 A | 9/1987 | McGregor et al. | |
| 4,749,059 A | 6/1988 | Jonnes et al. | |
| 4,751,261 A | 6/1988 | Miyata et al. | |
| 4,806,425 A | 2/1989 | Chu-Ba | |
| 4,937,142 A | 6/1990 | Ogushi et al. | |
| 4,952,021 A | 8/1990 | Aoki et al. | |
| 4,965,249 A | 10/1990 | De With et al. | |
| 5,036,121 A | 7/1991 | Coaker et al. | |
| 5,055,522 A | 10/1991 | Ikeda et al. | |
| 5,074,640 A | 12/1991 | Hardin et al. | |
| 5,225,635 A | 7/1993 | Wake et al. | |
| 5,227,080 A | 7/1993 | Berry | |
| 5,252,676 A | 10/1993 | Suyama et al. | |
| 5,326,638 A | 7/1994 | Mottine, Jr. et al. | |
| 5,356,710 A | 10/1994 | Rinehart | |
| 5,383,799 A | 1/1995 | Fladung | |
| 5,416,268 A * | 5/1995 | Ellis | H01B 11/1016 174/102 R |
| 5,460,885 A | 10/1995 | Chu-Ba | |
| 5,505,900 A | 4/1996 | Suwanda et al. | |
| 5,561,730 A | 10/1996 | Lochkovic et al. | |
| 5,565,242 A | 10/1996 | Buttrick, Jr. et al. | |
| 5,614,288 A | 3/1997 | Bustos | |
| 5,614,482 A | 3/1997 | Baker et al. | |
| 5,656,371 A | 8/1997 | Kawahigashi et al. | |
| 5,660,932 A | 8/1997 | Durston et al. | |
| 5,733,823 A | 3/1998 | Sugioka et al. | |
| 5,753,861 A | 5/1998 | Hansen et al. | |
| 5,852,116 A | 12/1998 | Cree et al. | |
| 5,856,405 A | 1/1999 | Hofmann | |
| 5,886,072 A | 3/1999 | Linsky et al. | |
| 5,912,436 A | 6/1999 | Sanchez et al. | |
| 5,925,601 A | 7/1999 | McSherry et al. | |
| 6,057,018 A | 5/2000 | Schmidt | |
| 6,064,073 A | 5/2000 | Hoogenraad et al. | |
| 6,080,489 A | 6/2000 | Mehta | |
| 6,086,792 A * | 7/2000 | Reid | H01B 1/24 174/102 SC |
| 6,114,036 A | 9/2000 | Rinehart et al. | |
| 6,137,058 A | 10/2000 | Moe et al. | |
| 6,146,699 A | 11/2000 | Bonicel et al. | |
| 6,159,617 A | 12/2000 | Foster et al. | |
| 6,179,665 B1 | 1/2001 | Rossman et al. | |
| 6,188,026 B1 | 2/2001 | Cope et al. | |
| 6,228,495 B1 | 5/2001 | Lupia et al. | |
| 6,270,849 B1 | 8/2001 | Popoola et al. | |
| 6,281,431 B1 | 8/2001 | Cumley | |
| 6,327,841 B1 | 12/2001 | Bertini et al. | |
| 6,347,561 B2 | 2/2002 | Uneme et al. | |
| 6,395,989 B2 | 5/2002 | Lecoeuvre et al. | |
| 6,416,813 B1 | 7/2002 | Valls Prats et al. | |
| 6,418,704 B2 | 7/2002 | Bertini et al. | |
| 6,461,730 B1 | 10/2002 | Bachmann et al. | |
| 6,474,057 B2 | 11/2002 | Bertini et al. | |
| 6,486,395 B1 | 11/2002 | Temblador | |
| 6,534,717 B2 | 3/2003 | Suzuki et al. | |
| 6,640,533 B2 | 11/2003 | Bertini et al. | |
| 6,646,205 B2 | 11/2003 | Hase et al. | |
| 6,810,188 B1 | 10/2004 | Suzuki et al. | |
| 6,850,681 B2 | 2/2005 | Lepont et al. | |
| 6,903,264 B2 | 6/2005 | Watanabe et al. | |
| 6,906,258 B2 | 6/2005 | Hirai et al. | |
| 6,906,264 B1 | 6/2005 | Grant, Jr. et al. | |
| 6,977,280 B2 | 12/2005 | Lee et al. | |
| 7,053,308 B2 | 5/2006 | Prats et al. | |
| 7,136,556 B2 | 11/2006 | Brown et al. | |
| 7,144,952 B1 | 12/2006 | Court et al. | |
| 7,411,129 B2 | 8/2008 | Kummer et al. | |
| 7,557,301 B2 | 7/2009 | Kummer et al. | |
| 7,749,024 B2 | 7/2010 | Chambers et al. | |
| 8,043,119 B2 | 10/2011 | Kummer et al. | |
| 2002/0002221 A1 | 1/2002 | Lee | |
| 2002/0043391 A1 | 4/2002 | Suzuki et al. | |
| 2002/0142175 A1 * | 10/2002 | Hase et al. | 428/447 |
| 2003/0098176 A1 | 5/2003 | Mesaki et al. | |
| 2003/0166749 A1 * | 9/2003 | Eckstein et al. | 524/101 |
| 2004/0007308 A1 | 1/2004 | Houston et al. | |
| 2004/0198909 A1 | 10/2004 | Breitscheidel et al. | |
| 2005/0019353 A1 | 1/2005 | Prinz et al. | |
| 2005/0023029 A1 | 2/2005 | Mammeri et al. | |
| 2005/0036753 A1 | 2/2005 | Will et al. | |
| 2005/0180725 A1 | 8/2005 | Carlson et al. | |
| 2006/0065430 A1 * | 3/2006 | Kummer et al. | 174/120 R |
| 2007/0066726 A1 * | 3/2007 | Sharma et al. | 524/210 |
| 2007/0098340 A1 | 5/2007 | Lee et al. | |
| 2007/0243761 A1 * | 10/2007 | Chambers et al. | 439/587 |
| 2009/0250238 A1 * | 10/2009 | Picard et al. | 174/102 R |
| 2010/0230134 A1 | 9/2010 | Chambers et al. | |
| 2010/0236811 A1 | 9/2010 | Sasse et al. | |

FOREIGN PATENT DOCUMENTS

| | | | |
|---|---|---|---|
| EP | 0364717 A1 | 4/1990 | |
| EP | 0544411 A1 | 6/1993 | |
| EP | 1524294 A1 | 4/2005 | |
| FR | 2674364 A1 | 9/1992 | |
| JP | 59159708 A | 9/1984 | |
| JP | 61076409 A | 4/1986 | |
| JP | 63094503 U | 6/1988 | |
| JP | 01110013 A | 4/1989 | |
| JP | 01144504 A | 6/1989 | |
| JP | 01166410 A | 6/1989 | |
| JP | 01307110 A | 12/1989 | |
| JP | 05266720 A | 10/1993 | |
| JP | 06057145 A | 3/1994 | |
| JP | 09045143 A | 2/1997 | |
| JP | 09251811 A | 9/1997 | |
| JP | 10012051 A | 1/1998 | |
| JP | 2001264601 A | 9/2001 | |
| JP | 2002231065 A | 8/2002 | |
| JP | 2003323820 A | 11/2003 | |
| WO | WO-89/00763 | 1/1989 | |
| WO | WO 9913477 A1 * | 3/1999 | H01B 3/44 |
| WO | WO-00/40653 A1 | 7/2000 | |
| WO | WO-01/081969 A1 | 11/2001 | |
| WO | WO-01/90230 A1 | 11/2001 | |
| WO | WO 02/47092 A1 * | 6/2002 | H01B 13/14 |
| WO | WO-05042226 A1 | 5/2005 | |
| WO | WO-2006016896 A1 | 2/2006 | |
| WO | WO-2007/084745 A2 | 7/2007 | |

OTHER PUBLICATIONS

WO 9913477 A1 provided with Office Action.*

Definition of "conduit" from www.merriam-webster.com Jun. 4, 2014.*

United States Patent and Trademark Office, Office Action in U.S.

(56) References Cited

OTHER PUBLICATIONS

Appl. No. 11/858,766, dated Jun. 9, 2008, 8 pp (US).
Dow Corning presentation entitled "MBs to Improve CoF—Injection Moulding & Extrusion"; from filed entitled "DC (multibase) Masterbatch training 2004.ppt"; date uncertain; 8 pages (US).
Howard & Howard letter to Mr. Thomas C. Wright dated Feb. 7, 2008 regarding U.S. Appl. No. 11/675,441 (2pp) (US).
Dow Corning Product Information sheet re Dow Corning MB50-321 composition, Jan. 15, 2001 (2pp) (http://www.dowcorning.com).
Dow Corning Product Information sheet re Dow Corning MB25-504 composition, Jan. 2, 2002 (4pp) (http://www.dowcorning.com).
Dow Corning Product Information sheet re Dow Corning MB40-006 composition, Mar. 4, 2008 (1p) (http://www.dowcorning.com).
Dow Corning Product Information sheet re Dow Corning MB50-002 composition, Jan. 15, 2001 (4pp) (http://www.dowcorning.com).
Dow Corning Product Information sheet re Dow Corning MB50-320 composition, Mar. 4, 2008 (1p) (http://www.dowcorning.com).
Dow Corning Product Information sheet re Dow Corning MB50-004 composition, Jan. 15, 2001 (4pp) (http://www.dowcorning.com).
Dow Corning Product Information sheet re Dow Corning MB50-008 composition, Mar. 4, 2008 (1 pp) (http://www.dowcorning.com).
Dow Corning Product Information sheet re Dow Corning MB50-010 composition, Jan. 16, 2001 (2pp) (http://www.dowcorning.com).
Dow Corning Product Information sheet re Dow Corning MB50-011 composition, Mar. 4, 2008 (1 pp) (http://www.dowcorning.com).
Dow Corning Product Information sheets re Dow Corning MB50-313 and MB50-314 composition, Jan. 15, 2001 (4pp) (http://www.dowcorning.com).
Dow Corning article "Siloxane additive minimizes friction in fibre optic cable conduit", 2001 (2pp) (http://www.dowcorning.com).
Crompton Corporation brochure on Amides (approx. 2003) (27pp).
Axel Plastics Research Laboratories, Inc., Product Data Sheet re "Mold Wiz, INT-33PA" (Approx. 2000) (1p).
Axel Plastics Research Laboratories, Inc., Product Data Sheet re "Mold Wiz, INT-40DHT" (Approx. 2001) (1p).
Axel Plastics Research Laboratories, Inc., Product Data Sheet re "Mold Wiz, INT-40GHT" (Approx. 2001) (1p).
E.I. Du Pont De Nemours and Company, Flyer entitled "Teflon", (Aug. 14, 2003) (1p) (http://www.dupont.com).
General Electric Company, Brochure entitled "GE Silicones-Fluids, Emulsions & Specialties", (2001) (19pp).
WITCO Corporation, Brochure entitled "Fatty Acids, Glycerine, Triglycerides", (1997) (22pp).
Crompton Corporation, Brochure entitled "Vinyl Additives Product Guide", (2002) (16pp).
United States Patent and Trademark Office, Office Action in U.S. Appl. No. 11/675,441, dated Dec. 28, 2007 (4pp).
United States Patent and Trademark Office, Office Action in U.S. Appl. No. 11/313,596, dated Mar. 20, 2007 (14pp).
United States Patent and Trademark Office, Office Action in U.S. Appl. No. 11/120,487, dated Nov. 2, 2005 (5pp).
United States Patent and Trademark Office, Office Action in U.S. Appl. No. 11/120,487, dated Jun. 8, 2006 (13pp).
United States Patent and Trademark Office, Office Action in U.S. Appl. No. 11/135,807, dated Dec. 15, 2005 (9pp).
United States Patent and Trademark Office, Office Action in U.S. Appl. No. 11/135,807, dated Jun. 8, 2006 (13pp).
Richard E. Marquis, Adam J. Maltby; An Introduction to Fatty Acid Amid Slip and Anti-Blocking Agents; Polymer, Laminations & Coatings Conf., Aug. 30, 1998; pp. 942-952 (US).
Cerro Wire, Inc.; Request for Inter Partes Reexamination Under 35 U.S.C. §§311-318 (USPTO); dated Sep. 26, 2008; pp. 1-90 (US).
Southwire Company; Response to Request for Inter Partes Reexamination (USPTO); dated Oct. 21, 2008; pp. 1-27 (US).
United States Patent and Trademark Office; Office Action in U.S. Appl. No. 11/675,441; dated Oct. 6, 2008, 6 pages (US).
*Southwire Company v. Cerro Wire, Inc.*; Complaint for Patent Infringement and Demand for Jury Trial (with Exhibit A), Civil Action No. 3:08-CV-092-JTC, U.S.D.C.; Northern District of Georgia; Newnan Division; Aug. 12, 2008; 16 pp (US).
*Southwire Company v. Cerro Wire, Inc.*; Answer to Complaint for Patent Infringement and Demand for Jury Trial; Civil Action No. 3:08-CV-092-JTC; U.S.D.C.; Northern District of Georgia; Newnan Division; Oct. 16, 2008; 8 pp (US).
*Southwire Company v. Cerro Wire, Inc.*; Southwire Company's Motion, Memorandum and [Proposed] Order to Dismiss Cerro Wire Inc.'s Defenses of Invalidity Under 35 U.S.C. 102 and 103; Civil Action No. 3:08-CV-092-JTC; U.S.D.C.; Northern District of Georgia; Newnan Division; Jan. 2, 2009; 19 pp (US).
*Southwire Company v. Cerro Wire, Inc.*; Defendant Cerro Wire Inc.'s Motion to Stay Pending Reexamination of the Patent-In-Suit; Civil Action No. 3:08-CV-092-JTC; U.S.D.C.; Northern District of Georgia; Newnan Division; Dec. 12, 2008; 11 pp (US).
*Southwire Company v. Cerro Wire, Inc.*; Southwire's Opposition to Defendant's Motion for Stay Pending Reexamination of the Patent-In-Suit (with Declarations of Winn Wise and Holly S. Hawkins); Civil Action No. 3:08-CV-092-JTC; U.S.D.C.; Northern District of Georgia; Newnan Division; Jan. 2, 2009; 75 pp (US).
*Southwire Company v. Cerro Wire, Inc.*; Defendant Cerro Wire's Reply Memorandum in Support of its Motion to Stay Pending Reexamination of the Patent-In-Suit; Civil Action No. 3:08-CV-092-JTC; U.S.D.C.; Northern District of Georgia; Newnan Division; Jan. 16, 2009; 17 pp (US).
*Southwire Company v. Cerro Wire, Inc.*; Defendant Cerro Wire, Inc.'s Response to Plaintiff's Motion to Dismiss Cerro's Invalidity Defenses Under 35 U.S.C. 102 and 103; Civil Action No. 3:08-CV-092-JTC; U.S.D.C.; Northern District of Georgia; Newnan Division; Jan. 16, 2009; 7 pp (US).
*Southwire Company v. Cerro Wire, Inc.*; Southwire Company's Reply in Support of its Motion to Dismiss Cerro Wire Inc.'s Defenses of Invalidity Under 35 U.S.C. 102 and 103 and Further Opposition to Cerro Wire, Inc.'s Motion for Stay Pending Reexamination of the Patent-In-Suit; Civil Action No. 3:08-CV-092-JTC; U.S.D.C.; Northern District of Georgia; Newnan Division; Jan. 26, 2009; 16 pp (US).
U.S. Appl. No. 60/544,224, filed Feb. 12, 2004, Carlson et al., 3 pp.
United States Patent and Trademark Office; Order Granting/Denying Request for Inter Partes Reexamination of U.S. Pat. No. 7,411,129 (with attached PTO/SB/08) (Application/Control No. 95/000,403); dated Dec. 5, 2008; 25 pages (US).
United States Patent and Trademark Office, Office Action in U.S. Appl. No. 10/952,294, dated Mar. 14, 2007, 10 pages (US).
United States Patent and Trademark Office, Office Action in U.S. Appl. No. 10/952,294, dated Mar. 4, 2008, 6 pp (US).
United States Patent and Trademark Office, Office Action in U.S. Appl. No. 10/952,294, dated Jul. 12, 2006, 13 pp (US).
United States Patent and Trademark Office, Office Action in U.S. Appl. No. 10/952,294, dated Aug. 7, 2007, 11 pp (US).
United States Patent and Trademark Office, Office Action in U.S. Appl. No. 12/017,222, dated Aug. 7, 2008, 8 pp (US).
United States Patent and Trademark Office, Office Action in U.S. Appl. No. 11/858,766, dated Feb. 9, 2009, 11 pp (US).
United States Patent and Trademark Office, Notice of Allowance in U.S. Appl. No. 12/017,222, dated Dec. 5, 2008 (12 pp).
United States Patent and Trademark Office, Notice of Allowance in U.S. Appl. No. 12/017,222, dated Jan. 8, 2009 (11 pp).
United States Patent and Trademark Office, Notice of Allowance in U.S. Appl. No. 12/017,222, dated Feb. 27, 2009 (8 pp).
*Southwire Company vs. Cerro Wire, Inc.*; Court Order Granting Stay of Litigation pending USPTO's Reexamination of U.S. Pat. No. 7,411,129, Civil Action No. 3:08-CV-092-JTC; U.S.D.C.; Northern District of Georgia, Newnan Division, May 12, 2009, 13 pp. (US).
Extended European Search Report for European Application No. EP 06739714.1, dated Nov. 12, 2009.
International Search Report and Written Opinion dated Aug. 21, 2006 from WO 2007/81372 (International App. No. PCT/US06/11069).

(56) References Cited

OTHER PUBLICATIONS

International Search Report dated Oct. 20, 2006 from WO 2006/127711 (International App. No. PCT/US06/19923).
International Search Report dated Dec. 20, 2005 from WO 2006/16895 (International App. No. PCT/US05/05165).
Dow Corning Product Information sheet re Dow Corning MB50-001 composition, Jan. 15, 2001 (6pp) (http://www.dowcorning.com).
Examination Report for New Zealand Application No. 564551, dated Aug. 14, 2009.
*Southwire Company* v. *Encore Wire Corporation and Cerro Wire, Inc.*; Southwire Company's Answer to Encore Wire Corporation's First Amended Answer, Affirmative Defenses, and Counterclaims, Civil Action No. 6:09-cv-289-LED; U.S.D.C. For the Eastern District of Texas, Tyler Division, Feb. 12, 2010, 17 pp. (US).
Dow Corning, Dow Corning MB50-011 Masterbatch Product Information, Ultra-high molecular weight siloxane polymer dispered in nylon 6, 1999, pp. 1-5.
International Search Report dated May 17, 2010 from WO 2010/107932 (International App. No. PCT/US2010/027684).
Wiles, John, "Clarifying Confusing Cables," Home Power #66, Aug./Sep. 1998.
Encore Wire, Inc.; Introductory Portion of Corrected Request for Inter Partes Reexamination Under 35 U.S.C. §§1.193 (Control No. 95/000,573); dated Oct. 8, 2010; pp. 1-74 (US).
Encore Wire, Inc.; Exhibits 1-9 (Claim Charts) of Corrected Request for Inter Partes Reexamination Under 35 U.S.C. §§1.193 (Control No. 95/000,573); dated Oct. 8, 2010; pp. 1-137 (US).
United States Patent and Trademark Office; Office Action in Inter Partes Reexamination of U.S. Pat. No. 7,749,024 (Application/Control No. 95/000,573), dated Dec. 3, 2010, 12 pages (US).
United States Patent and Trademark Office; Response to Office Action in Inter Partes Reexamination of U.S. Pat. No. 7,749,024 (Application/Control No. 95/000,573), dated Feb. 3, 2011, 1-17 pages (US).
Cerro Wire, Inc.; Introductory Portion of Request for Inter Partes Reexamination Under 35 U.S.C. §§311-318 (Control No. 95/000,594); dated Nov. 17, 2010; pp. 1-37 (US).
United States Patent and Trademark Office; Office Action in Inter Partes Reexamination of U.S. Pat. No. 7,749,024 (Application/Control No. 95/000,594), dated Feb. 11, 2011, 25 pages (US).
United States Patent and Trademark Office; Response to Office Action in Inter Partes Reexamination of U.S. Pat. No. 7,749,024 (Application/Control No. 95/000,594), dated Apr. 11, 2011, 1-35 pages (US).
Cerro Wire, Inc.; Exhibit W-1-W-10 (Claim Charts), Request for Inter Partes Reexamination Under 35 U.S.C. §§311-318 (Control No. 95/000,594); dated Nov. 17, 2010; pp. 1-1023 (US).
Cerro Wire, Inc.; Exhibit W-11-W-20 (Claim Charts), Request for Inter Partes Reexamination Under 35 U.S.C. §§311-318 (Control No. 95/000,594); dated Nov. 17, 2010; pp. 1-1023 (US).
Cerro Wire, Inc.; Exhibit W-21-W-30 (Claim Charts), Request for Inter Partes Reexamination Under 35 U.S.C. §§311-318 (Control No. 95/000,594); dated Nov. 17, 2010; pp. 1-1023 (US).
Cerro Wire, Inc.; Exhibit W-31-W-38 (Claim Charts), Request for Inter Partes Reexamination Under 35 U.S.C. §§311-318 (Control No. 95/000,594); dated Nov. 17, 2010; pp. 1-1023 (US).
Office Action for Co-Pending Patent Application No. 88656 in Panama dated Oct. 6, 2011, 2 pgs.
Cerro Wire, Inc.; Request for Ex Parte Reexamination Under 35 U.S.C. §§311-318 (USPTO); dated Oct. 1, 2009; 359 pages.
Encore Wire Corporation; Request for Ex Parte Reexamination Statements Under 35 U.S.C. §§1.150(b)(1) and 1.150(b)(2) (USPTO); dated Nov. 17, 2009; 44 pages.
Office Action for Co-Pending Patent Application No. 2008-513468 in Japan (Translation), dated Dec. 19, 2011, 12 pgs.
Wild, Frank: "The Effects of Silicone Polymer Additions on the Processing and Properties of an Isotactic Propylene Homopolymer," project submitted for the M.Sc. in Polymer Engineering and Technolgoy, Department of Materials Technology, The Manchester Metropolitan University, in Collaboration with Dow Corning Ltd., Sep. 1995 (102 pages).
Decoste, J. B.: "Friction of Vinyl Chloride Plastics," Bell Telephone Laboratories, Inc., Murray Hill, N.J., SPE Journal, Oct. 1969, vol. 25 (6 pages).
Dow Corning MB50-011 Masterbatch Product Information (4 pages).
Third Party Observations Against EP Patent Applicaiton No. 06-739-714.1 of Southwire Company (published as EP1899987) dated Apr. 7, 2012.
Third Party Observations Against EP Patent Applicaiton No. 06-770-960.0 of Southwire Company (published as EP1899988) dated Apr. 7, 2012.
Underwriters, Laboratories Inc., Standard for Safety, Metal-Clad Cables, UL 1569, Sep. 10, 1998, 159 pgs.

\* cited by examiner

FLEXIBLE CABLE WITH STRUCTURALLY ENHANCED CONDUCTORS

BACKGROUND

Metal-clad cables having a metal sheath potentially provide a low impedance and reliable ground path in order to function as an equipment grounding conductor. One type of such cable described in U.S. Pat. No. 6,486,395, assigned to the assignee of the present invention, contains a conductor assembly having at least two electrically insulated conductors cabled together longitudinally into a bundle and enclosed within a binder/cover. A bare grounding conductor is cabled externally over the binder/cover, preferably within a trough/interstice formed between the insulated conductors. In one type of metal-clad cable, the metal sheath is helically applied to form an interlocked armor sheath around the conductor assembly, and the bare grounding conductor is adapted to contact the sheath to provide the low impedance ground path.

However, in order to maximize the structural integrity of these and other types of cables, it is important that the conductors disposed within the metal clad cable be configured to withstand the various forces exerted on the cable during manufacturing, storage and/or installation. One solution is to enclose the conductors within the binder or cover to provide additional stability to the conductors disposed therein, especially additional strength against crushing forces. Another solution includes providing a talc powder around the conductors and beneath the binder/cover, providing a talc powder between the binder/cover and outer sheath and/or wrapping a Teflon wrap around each conductor (and talc, if present) prior to applying the binder/cover, in order to improve abrasion resistance, especially during flexing of the cable. However, cables having such configurations are costly to manufacture and can complicate manufacturing and field installation. For example, when terminating a cable, the binder/cover and Teflon wrap oftentimes remain exposed and must be separately cut or peeled away from the conductor assembly. This results in increased unnecessary material waste and increased labor costs.

SUMMARY

Embodiments provided herein contain an improved electrical cable of the type having an outer sheath enclosing a conductor assembly. The conductor assembly comprises a plurality of insulated conductors with a strength enhancer to provide increased resistance against crushing forces thereby obviating the need for a binder/cover disposed around the conductor assembly. According to embodiments disclosed herein, the strength enhancer may include a silicone oil, an erucamide and/or generally increasing the thickness of the conductor insulation such that, for example, the cable conforms to the performance criteria established by UL 1569.

In addition, embodiments provided herein include a method of increasing crush resistance of an electrical cable having an outer sheath enclosing a conductor assembly. In particular, methods disclosed herein provide for insulating one or more conductors, wherein insulating the one or more conductors includes providing a strength enhancer within the insulation and enclosing the insulated conductors with the outer sheath, wherein the electrical cable has increased crushed resistance without the need for a binder/cover.

BRIEF DESCRIPTION OF THE DRAWINGS

For a more complete understanding of the present invention, including additional features, objects and advantages thereof, reference is now made to the following detailed description, taken in conjunction with the drawings, in which.

DETAILED DESCRIPTION

Figure 1:
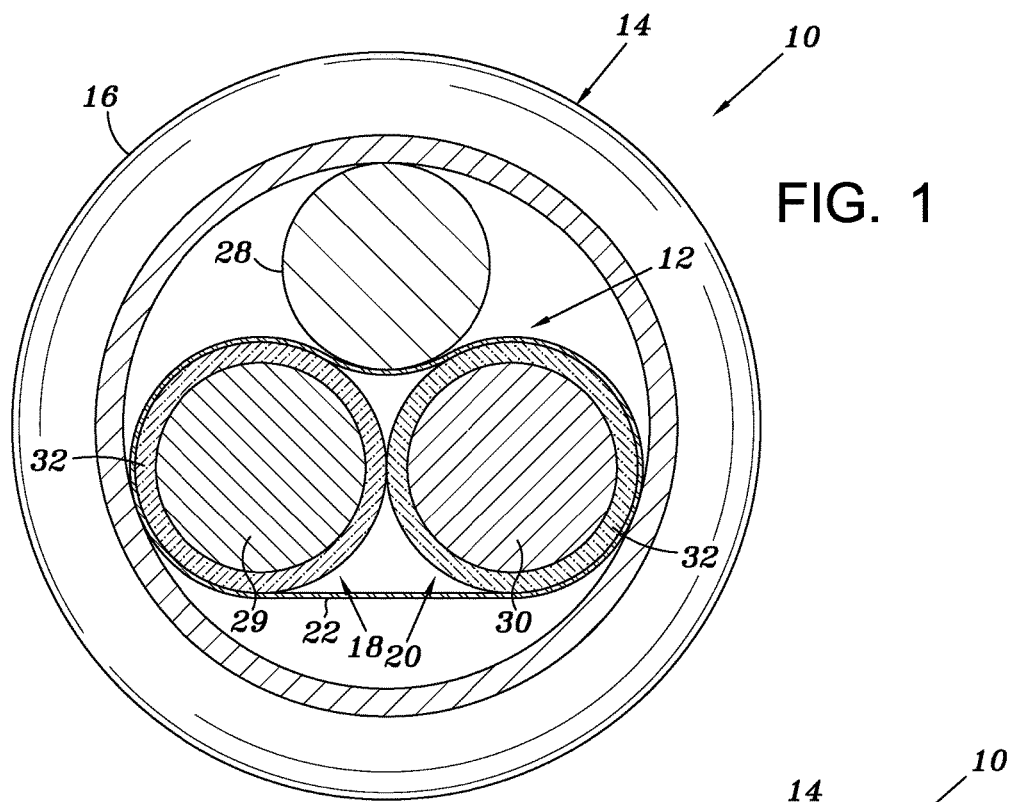
FIG. 1 is cross-sectional view of a prior art type metal-clad cable showing a conductor assembly comprising two electrically insulated conductors enclosed in a cover.

In the description which follows, like parts are marked throughout the specification and drawings with the same reference numerals, respectively. The drawings may not be to scale and certain features may be shown exaggerated in scale or in somewhat schematic form in the interest of clarity and conciseness.

Figure 2:
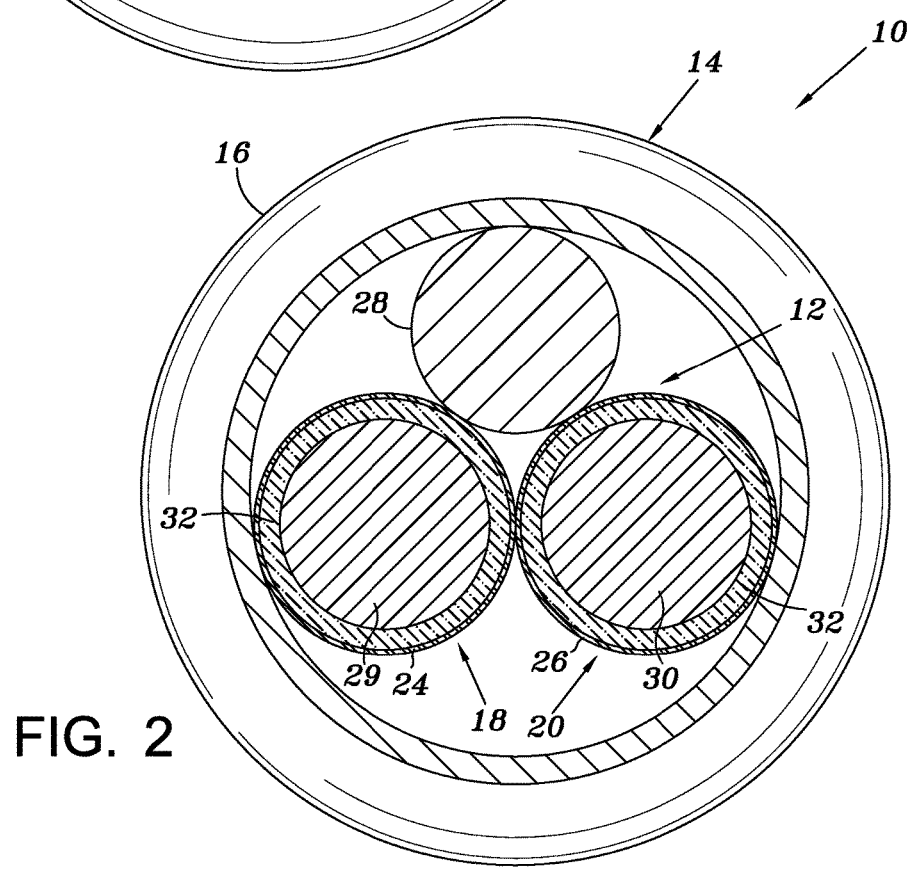
FIG. 2 is a cross-sectional view of another prior art type metal-clad cable illustrating a conductor assembly comprising two electrically insulated conductors enclosed in respective covers.

FIGS. 1 and 2 are diagrams illustrating a prior art flexible cable 10 in which a conductor assembly 12 is employed to advantage. In FIGS. 1 and 2, flexible cable 10 comprises a metal-clad armored electrical cable 14 characterized by an outer sheath or armor 16 (hereinafter referred to as sheath 16) disposed around conductor assembly 12. As illustrated in FIG. 1, conductor assembly 12 comprises two elongated and flexible insulated electrical conductors 18 and 20 disposed within a binder/cover 22 (hereinafter referred to as cover 22); however, it should be understood that each electrical conductor 18, 20 can be disposed within a respective cover 24 and 26, as illustrated in FIG. 2. A bare grounding conductor 28, such as, for example, a bare aluminum wire, is externally disposed with respect to covers 22, 24 and/or 26 and adjacent to conductor assembly 12.

As seen in FIGS. 1 and 2, electrical conductors 18 and 20 each include respective metallic wires 29 and 30 disposed within respective insulation 32 for protecting the metallic wires 29 and 30. While FIGS. 1 and 2 illustrate two conductors 18 and 20, it should be understood that cable 10 may have a greater or fewer number of conductors and a greater number of bare grounding conductors or no grounding conductors, depending on the type of cable and the particular application with which the cable 10 is to be used. In FIGS. 1 and 2, sheath 16 is formed of a metal strip having overlapping and interlocking adjacent helical convolutions, an example of which is described in U.S. Pat. No. 6,906,264, assigned to the assignee of the present invention, the disclosure of which is incorporated by reference herein; however, it should be understood that sheath 20 may be otherwise configured, such as, for example, a solid or non-interlocked metallic or non-metallic covering.

Covers 22, 24 and 26 of FIGS. 1 and 2 function to, among other things, act as a protective layer to enhance mechanical performance of cable 10. For example, covers 22, 24, 26 increase resistance to crushing and impact forces while still maintaining optimal flexibility of cable 10. The construction guidelines provided in Underwriters Laboratory Standard for Safety for Metal Clad Cables UL 1569 in effect as of the filing date of the present application (hereinafter UL 1569), the disclosure of which is incorporated herein by reference, call for a cover 22, 24, 26 for any cable assembly that contains a bare metal component such as a grounding conductor, a metal shielding tape, a drain wire or assemblies that are enclosed in an interlocked metal armor. For example, section 12.3 of UL 1569 provides for a cover composed of an elastomer-filled cloth or nylon tape that is frictioned on one or both sides. The cloth or tape can be of any necessary width, but must be at least 10 mils or 0.25 mm thick if of cloth and 6 mils or 0.15 mm if of nylon and should be helically applied. Alternatively, the covering can comprise a treated paper tape that is of any necessary width, and is at least 12 mils or 0.30 mm thick and should also be applied helically. Additionally, the covering can comprise a flat or corrugated polyethylene or terephthalate or other polyester tape or a polypropylene tape that is at least 2 mils or 0.05 mm thick.

Embodiments described herein provide an improved flexible cable 10 and method of making a flexible cable 10 having improved crush resistance comprising insulated conductors 18 and 20 each having a strength enhancer applied therein and/or thereto to enable cable 10 to be fabricated and used without cover(s) 22, 24, 26 and still maintain the mechanical performance characteristics such as those required under UL 1569. For example, as illustrated in FIG. 3, insulation 32 comprises a predetermined thickness "t" such that the advantages and functions provided by cover(s) 22, 24, 26 (i.e., increased resistance to crushing and impact forces while still maintaining optimal flexibility) are retained via insulation 32 rather than utilizing cover(s) 22, 24, 26, as illustrated in FIGS. 1 and 2.

Figure 3:
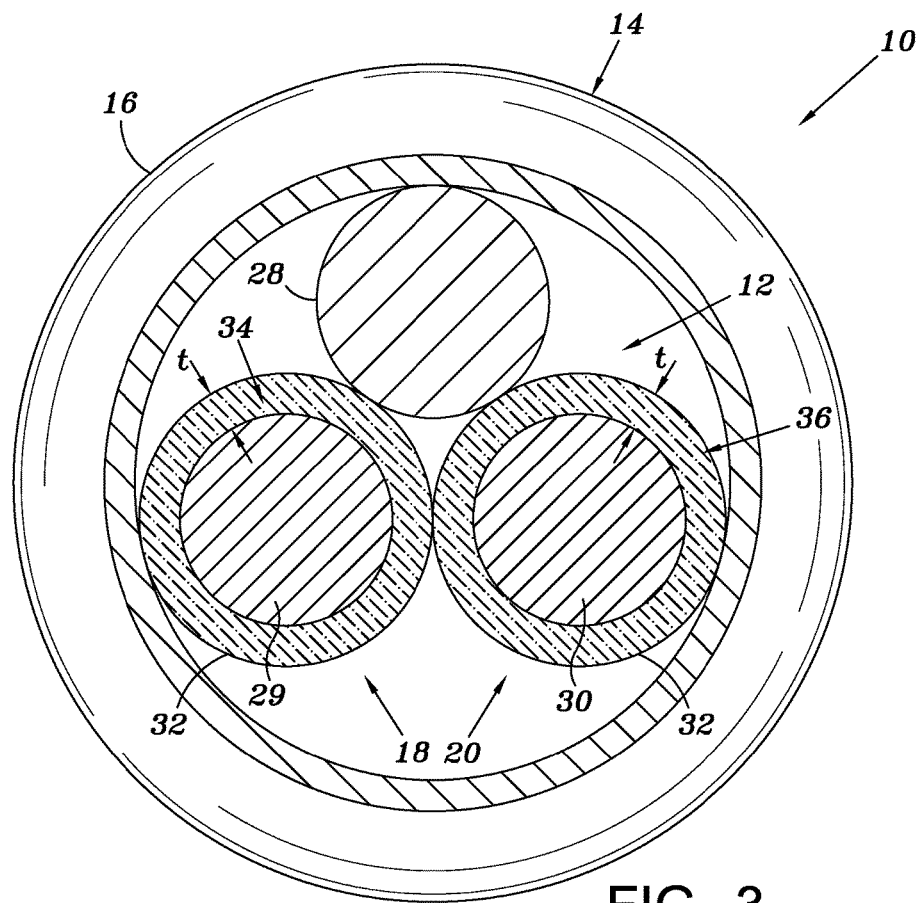
FIG. 3 is a cross sectional view of a metal-clad cable illustrating a conductor assembly comprising three electrically insulated conductors, each employing a strength enhancer to advantage.

In the embodiment illustrated in FIG. 3, insulation 32 surrounds respective wires 28 and 30. Insulation 32 contains an inner region 34 disposed generally around and in contact with wires 29 and 30 and an outer or extended region 36 integral with an inner region 34 and disposed generally along and forming the outer portion of insulation 32. Outer region 36 is sized to a predetermined thickness such that the combined inner and outer regions 34 and 36 comprise a combined thickness equal to or greater than the minimum thickness required by Underwriters Laboratory in order to maintain the performance characteristics required under UL 1569.

Preferably, the size of inner and outer regions 34 and 36 is dictated by performance criteria established by UL 1569. For example, UL 1569 describes various performance tests required of the finished cable (i.e., cable 10), one of which includes a crushing test. Inner and outer regions 34 and 36 are dimensioned based on performance criteria established in UL 1569 to determine the necessary thickness such that when cover 22, 24 and/or 26 is removed from conductor assembly 12, enhanced insulation 32 performs the functions that are otherwise performed by cover(s) 22, 24 and/or 26.

Additionally or alternatively, strength enhancer can include either a silicone oil or erucamide, which has been found to increase the crush resistance of insulation 32. In accordance with the testing subsequently described, it has been found that the crush resistance of an insulated wire sample having a silicone oil applied thereto is increased by almost 30% compared to an insulated wire sample not having a silicone oil applied thereto.

In accordance with one testing method, a pair of insulated conductors and a bare grounding conductor were wrapped within a metallic sheath. One cable contained pair of insulated conductors having a silicone oil applied thereto and the other cable contained a pair of insulated conductors without any silicone oil or strength enhancement applied thereto. The respective sizes of the conductors and cables were identical.

A force was applied to the cable assembly in accordance with UL 1569 and the force values, as listed in Tables 1 and 2 below, were determined. In particular, the cables were crushed between flat and horizontal steel plates in a compression machine. A solid steel rod was secured to the upper face of the lower steel plate and the cable was placed in between the steel plates and on top of the solid steel rod. Three separate cables were tested for each cable type (i.e., the strength enhanced and non-strength enhanced) at ten different points along the respective cables. During testing, the plates were compressed with increasing force on the cable until it was determined that contact had occurred between the conductors or between one or more of the conductors and the grounding conductor, the armor or both. Table 1 illustrates the test results without the strength enhancer. Table 2 illustrates the test results with conductors having the strength enhancer. As seen, the strength enhancer provided an increase in performance of almost 30% over the cable that did not utilize the strength enhancer.

TABLE 1

Test Data without Strength Enhancer

| Test No. | Cable 1 (Load Force) | Cable 2 (Load Force) | Cable 3 (Load Force) |
| --- | --- | --- | --- |
| 1 | 585 | 585 | 584 |
| 2 | 641 | 598 | 1669 |
| 3 | 977 | 636 | 573 |
| 4 | 1953 | 639 | 653 |
| 5 | 681 | 1101 | 1110 |
| 6 | 613 | 633 | 591 |
| 7 | 585 | 890 | 679 |
| 8 | 699 | 682 | 1256 |
| 9 | 760 | 659 | 621 |
| 10 | 569 | 1672 | 1024 |
| Average Load Force | 852.5 | 809.5 | 876 |

TABLE 2

Test Data with Strength Enhancer

| Test No. | Cable 1 (Load Force) | Cable 2 (Load Force) | Cable 3 (Load Force) |
| --- | --- | --- | --- |
| 1 | 560 | 474 | 1366 |
| 2 | 1353 | 507 | 708 |
| 3 | 1593 | 1333 | 699 |
| 4 | 1121 | 1559 | 1572 |
| 5 | 1426 | 1534 | 677 |
| 6 | 698 | 1552 | 649 |
| 7 | 1858 | 1169 | 1605 |
| 8 | 512 | 1448 | 607 |
| 9 | 1712 | 518 | 690 |
| 10 | 488 | 1291 | 1495 |
| Average Load Force | 1132.1 | 1138.5 | 1006.8 |

According to some embodiments, insulation 32 contains 0.25-0.85% of erucamide and a stearyl erucamide mixed into the conductor insulation 32. According to some embodiments, the silicone oil is a high molecular weight silicone oil. For example, the concentration, by weight, of the high molecular weight silicone oil is at least 9% by weight of the conductor insulation 32.

FIG. 3 depicts typical equipment 50 for manufacturing conductors 18, in accordance with one process of the present invention. According to some embodiments, insulation 32 is of an extruded polymer material such as, for example, nylon.

Equipment 50 may include a reel 52 which supplies metallic wires 29, 30 to an extruding head 54. Nylon pellets 56 are stored in tank 58, which is in flow communication with the extrusion head 54. A tank 60 with the desired strength enhancer 62 is adapted to be in flow communication with the tank 58 by way of conduit 64, thus enabling the mixing of the strength enhancer 62 with the nylon pellets 56, the mixture thereafter introduced into extruder 54. Alternatively, tank 60 may be adapted to be in fluid communication with extruder 54 by way of conduit 66, downstream from the point of entry of the nylon material, thus allowing strength enhancer 62 to mix with the nylon material 56 while in its molten state in the extruder. A cooling box 68 for cooling the extruded product is provided, and a take-up reel 70 is positioned for taking up the resulting conductor 18, 20.

Figure 4:
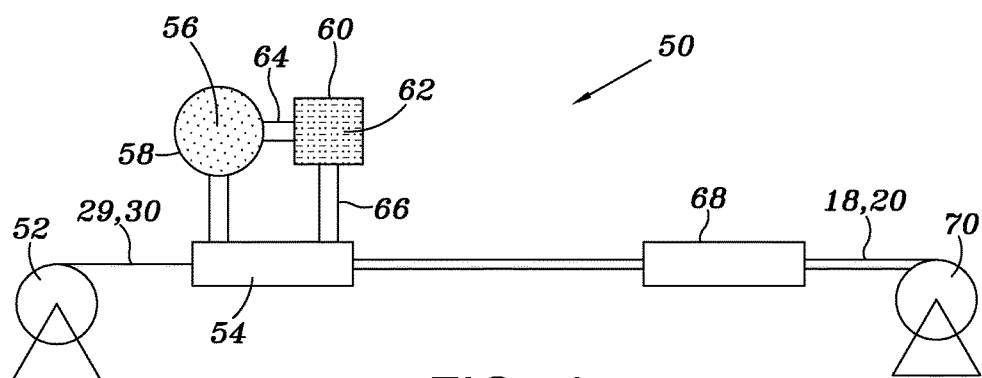
FIG. 4 is a diagram illustrating the use of typical manufacturing equipment uses in the manufacture of the insulated conductors having the strength enhancer.

As is therefore evident, the strength enhancer can be mixed with the material from which the insulation is to be extruded prior to extrusion or, alternatively, introduced into the extruding head for subsequent mixing with the molten extrusion material as the sheath is being formed. As a further alternative, the strength enhancer can be initially compounded with the polymeric material of the pellets themselves in a process upstream of that depicted in FIG. 4, thereby forming strength enhanced polymeric pellets, thus eliminating the need for tank 62 and conduits 64 and 66. Finally the strength enhancer can be applied to the insulation after the conductor has been extruded.

Polymeric materials that can be used for insulation 32 include polyethylene, polypropylene, polyvinylchloride, organic polymeric thermosetting and thermoplastic resins and elastomers, polyolefins, copolymers, vinyls, olefin-vinyl copolymers, polyamides, acrylics, polyesters, fluorocarbons, and the like.

According to some embodiments, in addition to increasing crush resistance, it has been found that the strength enhancer can be used to increase the abrasion resistance of insulation 32. For example, cable 10 is oftentimes provided with talc powder disposed around conductors 18, 20 and beneath the binder/cover 22. In some applications, a talc powder can also be disposed the binder/cover and outer sheath, which is used to increase the abrasion resistance of conductors 18 and 20, especially during flexing of cable 10. Additionally, a Teflon wrap can be applied around each conductor (and talc, if present) prior to applying the binder/cover, in order to improve abrasion resistance. However, it has been found that applying silicone oil or erucamide also acts to, in addition to increasing crush resistance of conductor insulation 32, increase abrasion resistance.

Although specific embodiments have been described in detail, those skilled in the art will also recognize that various substitutions and modifications may be made without departing from the scope and spirit of the appended claims.

What is claimed is:

1. An electrical cable having an outermost metallic sheath, the electrical cable comprising:
   a conductor assembly including a bare grounding conductor and at least an insulated conductor disposed within the outermost metallic sheath,
   the insulated conductor consisting of a single surrounding layer without an additional protective covering about the single surrounding layer, the single surrounding layer comprising a strength enhancer mixed therein for maintaining a crush and impact resistance of the single surrounding layer of the conductor when surrounded by the outermost metallic sheath, the strength enhancer including a lubricant, the single surrounding layer having the strength enhancer mixed therein being in direct contact with the outermost metallic sheath substantially along the length of the conductor and the outermost metallic sheath, the strength enhancer comprising a high molecular weight silicone oil having a concentration by weight of at least 9%;
   the combination of the single surrounding layer and the strength enhancer mixed therein replacing any further protective covering between the conductor and the outermost metallic sheath such that the single surrounding layer as part of the conductor maintains the crush and impact resistance as required by UL 1569 second edition, revision of Sep. 10, 1998 without the electrical cable having the further protective covering between the conductor and the outermost metallic sheath.

2. The electrical cable of claim 1, wherein the single surrounding outer layer comprises an extruded nylon polymer containing the strength enhancer mixed within.

3. The electrical cable of claim 2, wherein the extruded polymer is nylon.

4. The electrical cable of claim 1, wherein the bare grounding conductor is in direct contact with the outermost metallic sheath.

5. An electrical cable comprising:
   a metallic outer sheath conductively contacting a bare grounding conductor disposed within the metallic outer sheath;
   an insulated conductor consisting of a single outer layer without an additional protective covering between the single outer layer and the metallic outer sheath, the single outer layer having a lubricant mixed therein, the outer layer of the insulated conductor remaining in direct contact with the metallic outer sheath, and substantially along the length of the insulated conductor and the metallic outer sheath,
   the lubricant including 0.25-0.85% of erucamide and a stearyl erucamide such that the electrical cable maintains the crush and impact resistance requirements of UL 1569 second edition, revision of Sep. 10, 1998 without any additional cover between the insulated conductor and the metallic outer sheath.

6. The electrical cable of claim 5, wherein the outer layer comprises an outer region and an inner region, the outer region having the lubricant and a thickness to increase the crush and impact resistance of the conductor.

7. The electrical cable of claim 5, wherein the strength enhancer comprises an erucamide applied on the outer layer.

8. The electrical cable of claim 5, wherein the strength enhancer comprises a silicone oil and the silicone oil is initially applied on the outer layer.

9. An apparatus for protecting an electrical cable assembly including one or more insulated conductors and a bare grounding conductor, each insulated conductor consisting of a single outer surrounding layer, the apparatus comprising:
   an outermost metallic sheath surrounding the electrical cable assembly; and
   the one or more insulated conductors, in which each single outer surrounding layer is in direct contact with the outermost metallic sheath substantially along the length of the electrical cable assembly and the outermost metallic sheath, each single outer surrounding layer incorporating a strength enhancer formed of a high molecular weight silicone oil having a concentration by weight of at least 9% or a lubricant material including 0.25-0.85% of erucamide and a stearyl erucamide and mixed in an amount such that the outermost metallic sheath and the electrical cable assembly meet the crush and impact resistance requirements in UL 1569 second edition, revision of Sep. 10, 1998 without any additional layer.

10. The apparatus of claim 9, wherein the apparatus includes a bare grounding conductor in direct contact with the outermost metallic sheath.

11. An electrical cable having a metallic outer sheath, the electrical cable comprising a conductor assembly including a bare grounding conductor and at least an electrically insulated conductor, the electrically insulated conductor being a Type XHHW consisting of a surrounding layer consisting of a cross-linked polyethylene material and a strength enhancer mixed therein, the strength enhancer formed of a lubricant including a high molecular weight silicone oil having a concentration by weight of at least 9% or is between 0.25-0.85% of erucamide and a stearyl erucamide to maintain a crush and impact resistance of the conductor assembly when surrounded by the metallic outer sheath meeting the requirements of UL 1569 second edition, revision of Sep. 10, 1998 without requiring an additional protective covering between the surrounding layer and the metallic outer sheath, the single surrounding layer, comprising the cross-linked polyethylene material and the strength enhancer mixed therein, being in direct contact with the metallic outer sheath and substantially along the length of the electrically insulated conductor and the metallic outer sheath.

12. The electrical cable of claim 11, wherein the strength enhancer comprises an erucamide applied on the surrounding layer.

13. An electrical cable having a metallic outer sheath, the electrical cable comprising:

a conductor assembly, including a bare grounding conductor and at least an electrically insulated conductor contacting the bare grounding conductor, the electrically insulated conductor being a Type THHN consisting of a surrounding layer, the surrounding layer consisting of an outer portion of a nylon material around an inner portion of a polyvinylchloride material, and a strength enhancer mixed in the outer portion, the strength enhancer formed of a lubricant in an amount to maintain a crush and impact resistance of the conductor assembly when surrounded by the metallic outer sheath meeting the requirements of UL 1569 second edition, revision of Sep. 10, 1998 without requiring an additional protective covering between the surrounding layer and the metallic outer sheath, the strength enhancer including a high molecular weight silicone oil having a concentration by weight of at least 9% or is between 0.25-0.85% of erucamide and a stearyl erucamide; and the surrounding layer comprising the strength enhancer mixed therein being in direct contact with the metallic outer sheath, and substantially along the length of the conductor and the metallic outer sheath.

14. The electrical cable of claim 13, wherein the strength enhancer comprises an erucamide and the erucamide is applied on the surrounding layer.

15. The electrical cable of claim 13, wherein the strength enhancer comprises a silicone oil and the silicone oil is applied on the surrounding layer.

16. The electrical cable of claim 13, wherein the strength enhancer comprises an erucamide and the erucamide is mixed within the surrounding layer.

17. The electrical cable of claim 13, wherein the strength enhancer comprises a silicone oil and the silicone oil is mixed within the surrounding layer.

18. An electrical cable having an outermost metallic sheath, the electrical cable comprising:

a conductor assembly including a grounding conductor and at least an insulated conductor disposed within the outermost metallic sheath, the insulated conductor consisting of a single surrounding layer without an additional protective covering about the single surrounding layer, the single surrounding layer comprising a strength enhancer mixed therein for maintaining a crush and impact resistance of the insulated the conductor when surrounded by the outermost metallic sheath, the strength enhancer including a lubricant mixed therein and in direct contact with the outermost metallic sheath substantially along the length of the conductor and the outermost metallic sheath, the strength enhancer comprising a high molecular weight silicone oil having a concentration by weight of at least 9% or is between 0.25-0.85% of erucamide and a stearyl erucamide;

the combination of the single surrounding layer and the strength enhancer replacing any further protective covering between the conductor and the outermost metallic sheath such that the single surrounding layer as part of the conductor maintains the crush and impact resistance as required by UL 1569 second edition, revision of Sep. 10, 1998 without the electrical cable having the further protective covering between the conductor and the outermost metallic sheath.

19. An electrical cable having a metallic outer sheath, the electrical cable comprising:

a conductor assembly having a grounding conductor and at least one electrically insulated conductor contacting the grounding conductor, the at least one electrically insulated conductor being a Type THHN consisting of a surrounding layer, the surrounding layer consisting of an outer portion of a nylon material around an inner portion of a polyvinylchloride material, a strength enhancer mixed in the outer portion, the strength enhancer formed of a lubricant in an amount to maintain a crush and impact resistance of the at least one conductor when surrounded by the metallic outer sheath meeting the requirements of UL 1569 second edition, revision of Sep. 10, 1998 without requiring an additional protective covering between the surrounding layer and the metallic outer sheath, the strength enhancer including a high molecular weight silicone oil having a concentration by weight of at least 9% or is between 0.25-0.85% of erucamide and a stearyl erucamide; and the surrounding layer comprising the strength enhancer mixed therein being in direct contact with the metallic outer sheath, and substantially along the length of the at least one conductor and the metallic outer sheath.

* * * * *